United States Patent Office

3,267,782
Patented August 23, 1966

3,267,782
APPARATUS FOR SEVERING AND CONVEYING SHEETS
James A. Benzing, Hamilton, Ohio, assignor to Champion Papers Inc., Hamilton, Ohio, a corporation of Ohio
Filed July 26, 1962, Ser. No. 212,570
8 Claims. (Cl. 83—94)

This invention relates to a method and apparatus for severing sheets of selected sizes from continuous webs on a continuous basis. More particularly, the invention is concerned with a method and apparatus for continuously conveying the severed sheets away from a cutting operation and for stacking the sheets delivered from the apparatus on a continuous basis for subsequent removal while also permitting diversion of selected numbers of sheets.

While the invention has particular application in the paper industry, and will be described in terms of its use in that industry, it will be recognized that it is capable of utility in a variety of similar applications regardless of the material being converted from web to sheet form so long as the web material is capable of being cut on conventional cutting apparatus.

Turning now to a specific application of the invention, it is well recognized the paper industry has long been without a satisfactory cutting and sheet delivery system which will enable continuous cutting of sheets of predetermined size from logs or large rolls as are manufactured in the papermaking process. Under presently existing conditions it is customary to cut sheets from rolls fed into a rotary cutter; the cut sheets then being conveyed away from the cutter by a tape system to some form of stacking arrangement. As the stacked sheets reach a predetermined number, usually dictated by subsequent usage or processing of the sheets, it is necessary to shut down the cutting operation until the stacked pile, known in the industry as a "lift" is removed from the lift forming station after which the operation is resumed until a new "lift" of paper sheets is generated whereupon the stop and restart process is repeated.

In the preceding paragraph and at other points hereinafter reference is made to a "lift" which is one particular style of package common in the paper industry. However, it is to be understood that this is for example only and the reference to a "lift" is not intended to restrict the invention solely to the formation of a "lift." Other types of stacking arrangements are completely feasible and are contemplated by the invention. For example, the cut sheets may be formed into stacks on pallets (commonly called a "palletized" unit), or may be delivered directly into boxes. Other suitable types of stacking arrangements are also contemplated.

Also, it is customary in many cases to remove certain sheets discharging from the cutter for inspection purposes either on a spot or statistically determined basis to assure that the quality of the cut sheets in a given package, such as a "lift," is adequate to meet specifications essential to satisfactory subsequent use.

Moreover, scanning devices or defect detectors are coming into use. These contrivances generally include an optical means for scanning a moving web of material, and an indicating means for reporting defects observed by the scanning means. Frequently a photo-electric effect is employed in these devices. Inasmuch as the scanning devices can operate on a continuous basis they are suitable for use with the instant invention.

The novel apparatus herein disclosed, makes it possible to combine the inspection step with the continuous cutting of webs and delivery of the cut sheets on an uninterrupted basis to form "lifts" and effects these results while maintaining the maximum possible degree of positive control over the moving sheets during the transfer and stacking operation.

Further, since the present apparatus obviates the necessity of periodic shutdowns to remove "lifts" of paper from the delivery or cut end of the cutting operation, it effects considerable increase in production from one cutting apparatus. The ramifications of the invention may be appreciated when it is realized that improved techniques and faster papermaking machines have enabled substantial increases in rate of manufacture of the paper rolls, while little has been done, outside of duplication of existing facilities, to enable cutting operations to keep pace with the papermaking process. Too, paper cutting, i.e. finishing operations are becoming of the most expensive steps in the production of sheeted, as distinguished from roll paper.

Accordingly, an object of the present invention is to provide a method and an apparatus for continuously processing material in web form into sheets of predetermined dimensions.

A further object of the invention is to provide a method and an apparatus for continuously delivering sheets of material to one of a plurality of stations.

Another object of the invention resides in providing a method of and an apparatus for automatically changing the station to which the cut sheets are delivered, the station changing being accomplished without interruption of the cutting, conveying and delivering operations.

Still another object of the invention resides in providing a method of and apparatus for continuously operating a cutting and conveying system for forming sheets from a continuous web and stacking the same at one of a plurality of selected stations, and for changing to a different station when the stack includes a predetermined quantity.

An additional object of the invention is to deliver sheets of cut material from a cutter to a stacked position with a minimum of damage to the sheets or loss of production due to misaligned or uncontrolled passage of the sheets from the cutter to final resting point.

A further object of the invention is to develop a cutter delivery system wherein the operation from rolls to packages is continuous and wherein selected sheets or samples may be removed from the system for inspection.

These and other object of the invention may be accomplished by providing one or more rolls of web material, feeding the material to a cutter for severing sheets of a desired length from the rolls, and thereafter conveying the sheets away from the cutter and directing the respective sheets to one of a plurality of positions, selectively and alternatively.

Preferably, the steps of conveying and delivering are achieved by method steps and apparatus wherein the leading edge of each sheet is positively controlled from the time of severance until time of deposit to form a package.

Where inspection is desired, the apparatus can also include means associated with said conveying means for selectively removing sheets from the system, prior to stacking, for inspection purposes.

In addition, control means may be associated with the apparatus to provide for automatic rejection of defective sheets responsive to the signals generated by defect detectors and the like.

Having set forth the description of the apparatus in general terms, a further and more detailed description follows in which reference will be made to the attached drawings forming a part thereof, when.

Figure 1:
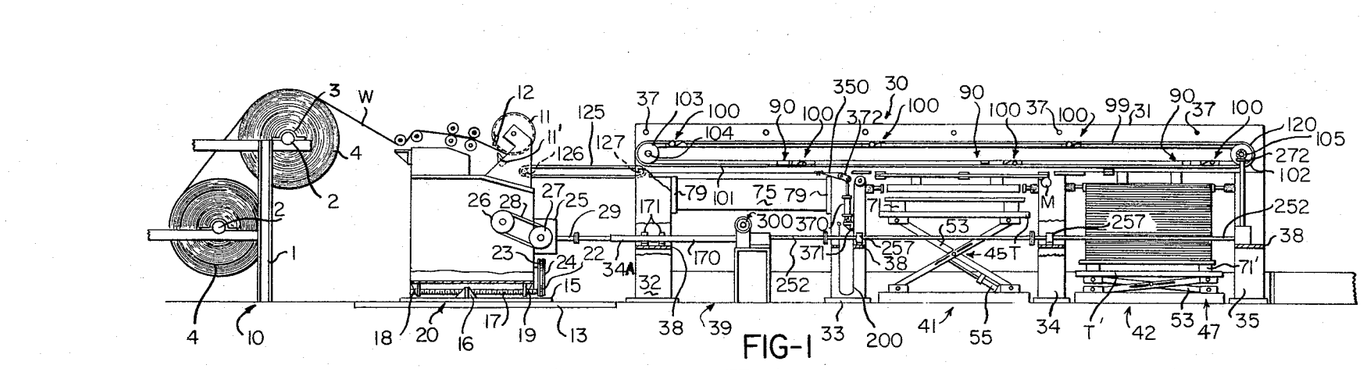
FIG. 1 is a schematic side elevation of the cutter and delivery system comprising the invention with the cutter shown in outline form.
Figure 2:
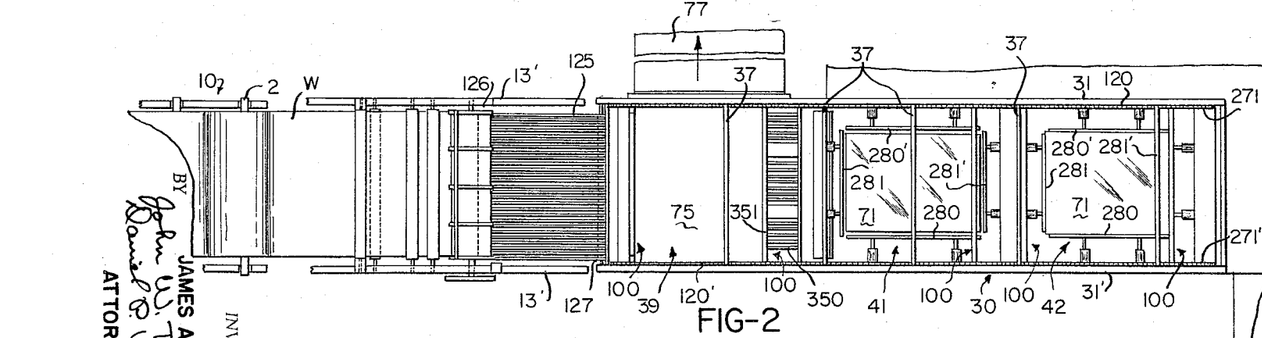
FIG. 2 is a top schematic plan view of the apparatus shown in FIG. 1.

Turning now to FIGS. 1 and 2, an initial explanation of the overall operation of the apparatus follows, with reference being made to the more detailed figures from time to time, as the description proceeds. As seen in FIGURES 1 and 2, the apparatus comprises essentially a roll stand 10, a cutter 20 and a gripper delivery assembly 30. Roll stand 10 is essentially a framework 1 provided with journals 2 adopted to receive roll cores 3, thus to support paper rolls 4 on the framework. Although only two rolls are shown in FIGS. 1 and 2, conventionally such roll stands may hold as many as eight rolls of paper or other material.

From the roll stand 10 or "black stand," as more conventionally known in the paper industry, the web material W is fed to cutter 20. In some cases only one roll at a time is fed to the cutter, however, in high volume production all eight rolls may be feeding to the cutter simultaneously so that web W is actually comprised of eight thicknesses. This, of course, means that the cutter is cutting eight identically dimensioned sheets simultaneously. Cutters of this type are well known and a specific example would be a Clark-Aiken, model "C," manufactured by Clark-Aiken Company of Lee, Massachusetts.

As has been stated the cutter 20 is conventional, the web W being fed through a series of flattening and conditioning rolls, thence over a bed knife 11' where it is severed by the action of flyknife 12 against the bed knife. Flyknife 12 is mounted on a revolvable support 11. It will be appreciated that variable sheet lengths may be cut on this equipment the change being a function of variations in the ratio of web speed over the bed knife to the speed of rotation of the flyknife. Thus for a given web speed, changes may be made by slowing down or speeding up the rate of rotation of the flyknife which produces a longer or shorter sheet length as desired. Such cutters as that described include variable speed transmissions conventionally and thus this particular subject matter need not be discussed in detail here.

While cutter 20 is conventional the manner of fixing the cutter to a floor structure is considerably different than what is considered standard practice. Traditionally, such cutters are bolted or otherwise semi-permanently attached to the floor in a fixed permanent position. In ths case, however, the cutter 20 is so mounted that it may be moved relative to the gripper delivery system 30 in the same direction as that in which the web W moves through the system. This movement is affected by providing a pair of parallel rails 13, 13' (in FIG. 1) imbedded in the floor. The cutter frame 14 is provided at each side with sole plates 15 only one being shown, each of which is adapted to rest on one each of the rails 13, 13'. Fixed to the floor is a bracket assembly 16 through which is threaded an elongated screw jack 17. The ends of the screw jack are journaled in a pair of trunnion brackets 18 and 19 at the forward and rearmost edges of the frame.

Fixed to the forward end of jack 17 is a sprocket 22. Sprocket 22 is connected to sprocket 23 by a chain 24. The sprocket 23 is in turn driven by a reversible electric motor (not shown) such that sprockets 22 and 23 may be rotated, hence screw jack 17 may also be rotated, in either direction. Obviously, since the screw jack 17 is fixed to frame 14 longitudinally of its length and since it is threaded through bracket assembly 16 rotation of the jack will cause the cutter 20 to move along rails 13, 13' in either of the two directions, toward and away from the delivery assembly 30 depending on which way the jack 17 is rotated. Obviously, to assure straight line movement, the arrangement described is duplicated on the opposite side of the cutter frame from that shown in FIG. 1 and it, too, is driven from the identical reversible motor mentioned above. Thus the cutter 20 is always moved in true straight line motion between roll stand 10 and gripper delivery 30 within the limits which have been previously selected in determining the length of screw jack 17. The purpose of this arrangement will become readily apparent as the description proceeds, it being sufficient to state here that it permits of the cutting and delivery of sheets of a variety of lengths to the gripper delivery assembly 30.

It might well be pointed out here, that cutter 20 conventionally includes a gear train and electric motor drive system for the various moving components. As stated above this system is well known in the art and need not be discussed in detail except to state that in the present apparatus a suitable means is provided to enable this gear train to simultaneously drive a right-angle gear box 25 via sprockets 26 and 27 and chain 28. The gear box 25 is, in turn, connected to a drive shaft 29 as is apparent from an inspection of FIGURE 1 for the purpose to be described in detail.

Turning now to the gripper delivery system 30, it will be seen that there is provided a frame structure comprised of spaced, parallel horizontally disposed support beams 31, 31' supported on a series of spaced vertical stanchions 32, 33, 34, 35. The entire framework is laced together by a series of cross-braces 37, 38 between beams 31, 31', and stanchions 32, 33, etc. Thus the gripper delivery framework, in effect, is divided into a series of bays 39, 41 and 42 in this particular application. However, more than or less than three bays may prove advantageous depending on circumstances such as size of sheets being cut; speed of the cutter; inspection technique being employed and the like.

Figures 3, 4, 5, 6, 7, 8:
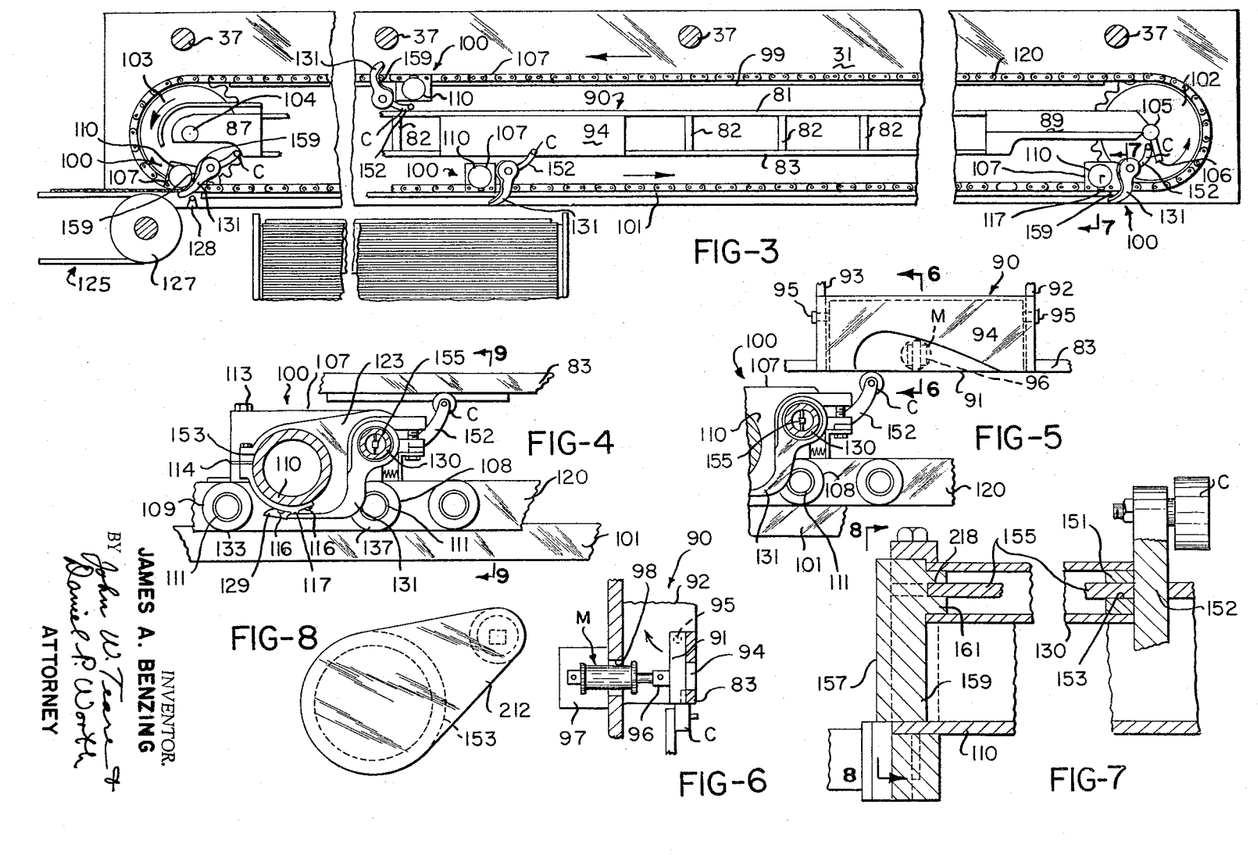
FIG. 3 is a fragmentary, elevational view of the cam means for controlling the gripping means utilized to convey a sheet away from the cutter.
FIG. 4 is a sectional view, somewhat enlarged, of the gripping means structure.
FIG. 5 is a sectional view similar to FIG. 4, showing the control cams used to actuate the gripper means.
FIG. 6 is an enlarged sectional view taken along the line 6—6 of FIG. 5.
FIG. 7 is a sectional view through a gripper bar assembly taken along the line 7—7 of FIG. 3.
FIG. 8 is an end view of one of the gripper bars corresponding to the line 8—8 of FIG. 7.

As seen in FIG. 2 and, as well, FIG. 3, the framework formed by support beams 31, 31' as well as bracing 37, etc., is completely open, top and bottom. The braces 37, etc., are so arranged that the area defined by each of the bays 39, 41, 42 is also open, such that sheets carried along the longitudinal length of the gripper frame, may be discharged downwardly as will be apparent as the description proceeds.

Disposed within each of the bays 41 and 42, and below the plane in which the cut sheets are moved longitudinally of the delivery frame are vertically movable tables 45 and 47. These tables, called scissor-lift tables, are conventional in the art and, per se, form no part of the invention. They derive their name from their use in the trade and because vertical movement of the top portions, which receive articles placed thereon, is derived by means of a scissor type of lifting mechanism powered by a hydraulic motor. The scissor legs are shown slidable relative to each other in FIG. 1. For example, the Clark-Aiken Company, previously mentioned, supplies such tables to the industry as does American Manufacturing Company of Tacoma, Washington, among others.

In practice a conventional wooden pallet, such as a pallet 71, 71' is placed on each table top T, T' and facilitates easy removal of the completed palletized package by fork-lift truck or other similar conveyance. The tables may be operated under either manual or automatic control and their operation in the overall combination will be amplified further as the detailed description of the invention continues hereafter.

Turning now to the area defined as bay 39, it will be noted in FIGS. 1 and 2 that no lift table is provided in this bay. Instead bay 39 is provided with an endless belt conveyor 75 which is trained over rollers such as 79 journaled in suitable bearings provided in the vertical stanchions 32 and 33 and conventionally driven by an electric motor (not shown). The belt 75 thus moves laterally with respect to the gripper delivery assembly 30 and, as well, with respect to the path of movement of the cut sheets as they are conveyed longitudinally of the apparatus. The top surface of conveyor 75 is disposed below the plane in which the sheets move from the cutter 20 and preferably the conveyor is inclined downward toward its discharge end such that any sheets deposited thereon will be conveyed laterally away from the apparatus to an inspection table 77 or the like. Thus certain sheets or numbers of sheets may be diverted from the gripper delivery system on a selected or random basis to inspection table 77. As in the case of bays 41 and 42 the manner in which the sheets may be deployed will become apparent as the description proceeds in detail.

Having described the general layout of the overall combination of the cutter-gripper delivery system generally, specific attention is now directed to FIGS. 3, 4 and 5 as the manner of conveying the cut sheets from cutter 20 to and through the sheet delivery system 30 will be set forth in detail. In so doing, attention is directed to the fact that various parts may be duplicated on support beams 31, 31' respectively. However, since the effective control mechanism for the system is associated with support beam 31, the description matter is directed to this structure (FIG. 3 et seq.), it being understood that various parts such as chains 120, sprockets, etc., will be duplicated and fixed to support beam 31' as may be required.

As clearly shown in FIGS. 3, 4 and 5, support beam 31 is provided on its inner face with a cam system which serves to control a series of gripper bar assemblies 100 which engage and convey the sheets away from the cutter 20. This cam system is comprised of a pair of vertically spaced, parallel upper, horizontal upper and lower cam rails 81 and 83, respectively. These cam rails are fixed to and suitably spaced inwardly from the vertical face of support beam 31 by means of a series of spacer plates 82. The spacer plates 82 may be fixed both to the frame rail 31 and the cam tracks by any suitable means such as by welding or the like. The two rails are joined at their ends to form a continuous elongated cam by gripper closing cam plate 87 and gripper opening cam plate 89 as clearly shown in FIGURE 3 wherein closing cam plate 87 is disposed closely adjacent the cutter 20 while the cam opening plate 89 is disposed at the opposite end of the support beam 31 adjacent its terminal end.

The upper cam track 81 is unbroken in the sense that it defines a continuous cam guiding surface from end to end. The lower cam track 83, however, is discontinuous in the sense that at selected points throughout its length means are provided where the continuity of the surface may be broken. These means are comprised of at least three gripper release cam assemblies 90, the details of which are clearly shown in FIGS. 5 and 6 and the general location of which is shown schematically in FIGURE 1.

Since each gripper release assembly 90 is the same, description of one will suffice for all. Accordingly, each gripper release assembly 90 is comprised of a vertically disposed blocking plate 91 pivotally mounted on a pair of vertical and parallel spacer plates 92, 93 by hinge pins 95. The lower edge of blocking plate 91 is so positioned as to form a coplanar but vertically offset continuation of the bottom of cam track 83 when the plate is vertically disposed as shown in FIG. 6. In superposed relation with respect to the blocking plate 91 is a gripper release cam 94. The function of this cam 94 will be subsequently apparent, however, it will be seen that a cam such as cam follower C, shown in FIGS. 5 and 6, bearing against the lower side of cam track 83 can be caused to follow either the path defined by the blocking plate 91 or the release cam 94, depending on whether or not the blocking plate is in contiguous relation with respect to cam 94 or is swung away from the cam as indicated by the arrow in FIG. 6.

To effect movement of the blocking plate 91 about hinge pins 95 the back of this plate is provided with a bracket 96 to which is pin connected the rod end of a small hydraulic or pneumatic motor M. The cylinder end of the motor M is, in turn, pin connected to a further bracket 97 provided on the outside of support beam 31. Obviously aperture 98 is provided in the web of the support beam 31 to permit motor M to be positioned as described. It is believed also quite obvious that movement of the piston rod of motor M into and out of the cylinder barrel, in the conventional manner, will effectively cause blocking plate 91 to be swung to either non-blocking or blocking position with respect to release cam 94 as has been described above.

Figures 9, 10, 11, 12, 13, 14, 15:
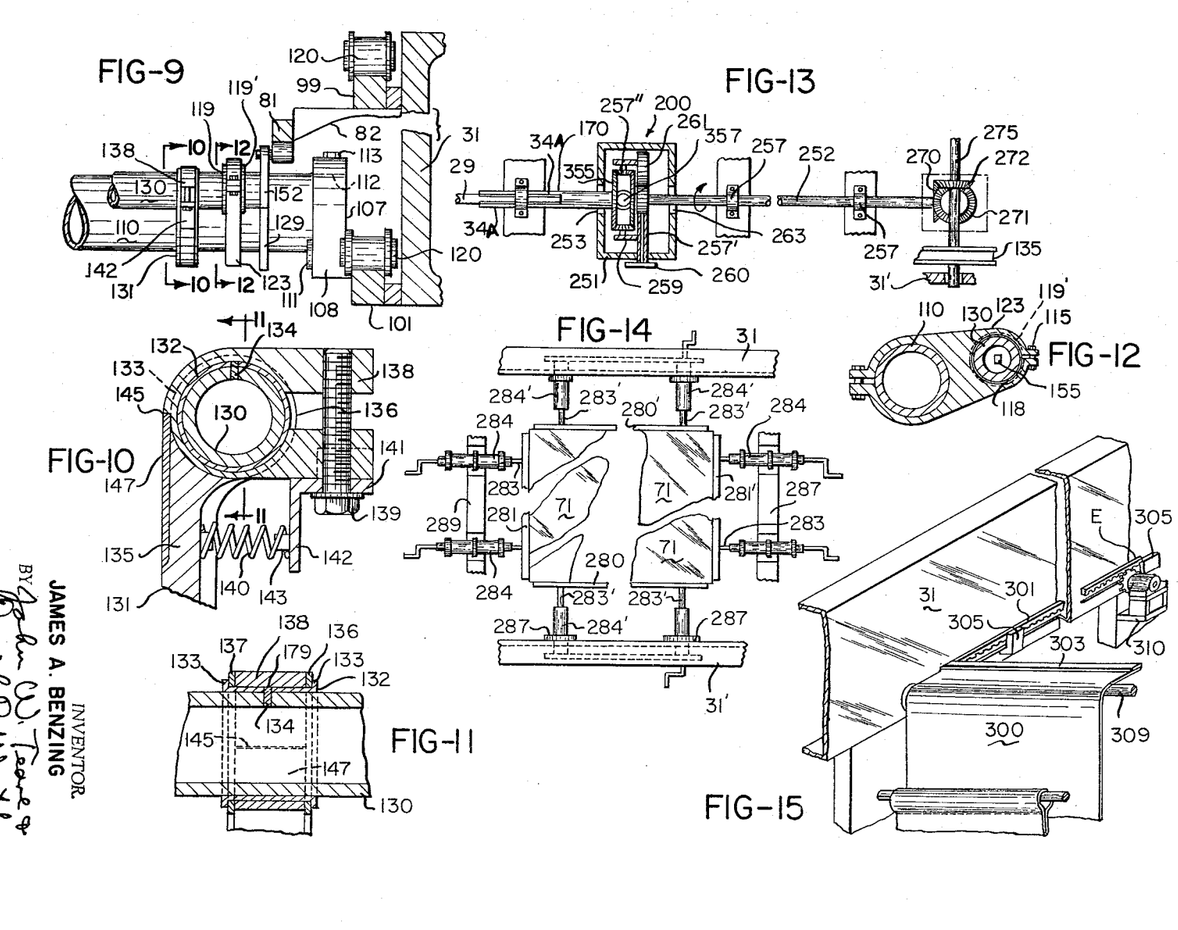
FIG. 9 is a sectional view taken along line 9—9 of FIG. 4.
FIG. 10 is a sectional view through a gripper bar assembly as seen along line 10—10 of FIG. 9 showing the manner of mounting each finger on the gripper bar.
FIG. 11 is a sectional view along the line 11—11 of FIG. 10.
FIG. 12 is a view along line 12—12 of FIG. 9 showing the clamping means for holding the torsion bar affixed to the gripper bar assembly.
FIG. 13 is a fragmentary plan view, partially in section showing the drive means for powering the gripper delivery system.
FIG. 14 is a plan view showing a lift as formed.
FIG. 15 is a partial perspective view showing details of the blanket drive means.

Directing attention again to FIGS. 3 and 4 generally, and in particular FIG. 9, it will be seen that the support beam 31 is also provided with a pair of parallel and horizontal upper and lower bars 99 and 101, respectively. These bars 99 and 101 are chain guides so related to both upper and lower cam tracks 81 and 83 such that a chain 120 traversing the length of the entire gripper delivery assembly 30, will be maintained in a parallel position with respect to the cam tracks 81, 83 during its movement.

Chain 120 is, in turn, trained around a pair of sprockets 102, 103. These sprockets are disposed at the extreme ends of support beam 31 (also 31') and are carried on a pair of parallel horizontal shafts 104, 105 suitably journaled therein. Preferably sprocket 102 is keyed to shaft 105. Thus if shaft 105 is driven from a suitable source of power, as will be described, sprockets 102 and 103 along with chain 120 will be positively driven such that the upper flight of chain 120 moves toward the cutter 20, while the lower flight thereof moves away from cutter 20 toward the terminal end of the delivery assembly 30. It will be noted that sprocket 102 also is provided with a spoke-like projection 106, the function of which will be described hereinafter.

As has been pointed out, the cutter 20 is longitudinally movable with respect to the delivery system 30 via the slidable floor connection means previously described. While the purpose for this arrangement will become apparent subsequently, it should be pointed out at this time, that the conventional tape system used to convey the cut sheets away from the bed knife 11' is modified to some extent. Essentially the modification comprises the use of elastic or stretchable tapes 125 between the cutter 20 and the delivery mechanism 30. The tapes are illustrated in FIGS. 1, 2 and 3, as may be seen, are trained over a pair of conventional tape guiding rolls 126 and 127, the former being journaled on the cutter frame, the latter on support beams 31, 31' gripper delivery assembly 30. As is conventional, the roll 126 is driven via the usual cutter gear train drive system. By this arrangement the linear velocity of the upper conveying surface of the tapes 125 is always properly coordinated such that regardless of the length of sheet being cut, the cut sheets will be continuously and promptly carried away from the cutter at the same speed as the web W is fed through the cutter 20 and cut.

Since tapes 125 are extensible and contractible in length, it is possible to move the cutter 20 toward or away from the delivery assembly 30, which is obviously fixed, without interfering with the ability of the tapes 125 to convey the cut sheets from the cutter 20 and onto the delivery system 30.

Turning now initially to FIGS. 1, 3 and 9 and also collaterally therewith enlarged detailed FIGS. 4, 5, 7 and 8, it will be seen that chain 120 serves as a carrier for a plurality of sheet gripper assemblies 100, mentioned previously, which are separated by equal intervals along the length of the chain 120. The function of these assemblies 100 is to positively grip the leading edge of each sheet cut by the cutter 20 and to positively guide and convey each sheet along the length of the delivery system until a point of deposit, whether it be bay 39, 41 or 42, is reached and there to release the leading edge such that the sheet may come to rest at the desired position on either of the pallets 71 or conveyor 75 as the case may be. It will be noted that each gripper assembly 100 will engage the leading edge of each sheet at the point where this edge is just leaving tapes 125, as illustrated in FIGS. 1 and 3. Before, however, delving into the precise manner of securing this result, consideration should and will be given to the structure of the gripper assemblies 100 and their operation.

Each gripper assembly 100 includes a pad bar 110 which is fixed to chain 120 by means of a connector block 107. These blocks 107 are fixed to the inside of the links making up chain 120 by any one of a number of means, that illustrated comprising a pair of forward and rearward extending lugs or ears 108, 109, through which is passed elongated link pins 111 fastening the connector block and the chain links and connector block one to the other. Each connector block 107 is generally rectangular in elevation and of a width approximately equal to the width of chain 120 (see FIGS. 4, 5, and 9). The central portion of the connector block 107 is provided with a cylindrical aperture 112 in which is clamped gripper bar 130 by means of the usual slot 114 and bolt 113 type of clamping arrangement.

With each pad bar connected to chain 120 (also 120') as described, it is quite obvious that they extend transversely across the space between support beams 31, 31' and are moved continuously along the entire frame as the chains 120, 120' are caused to traverse the length of the delivery assembly 30.

Affixed to the pad bar 110 by means of rivets 116 are a series of pads 117. These pads 117 are spaced evenly across the entire length of the pad bar 110. As shown clearly in FIG. 4, these pads can best be defined as generally Y-shaped with the diverging arms of the Y fixed to the pad bar 110 by the rivets 116. The trunk of the Y is comparatively thicker than the legs and is cylindrical in form defining a round button or pad projecting but a very slight distance vertically downward from the lowermost point on the pad bar 110.

As is illustrated in part in FIGS. 9 and 12, the pad bar 110 is provided with a series of brackets 123. These brackets 123 generally four in number are spaced at equal intervals along pad bar 110 and are clamped by any suitable means so as to be immobile thereon. As shown in FIG. 12 each bracket 123 is generally elliptical in shape and provided with further means for engaging bearing 118 fixed to a tubular member 130 to retain the latter laterally fixed but rotatably mounted on pad bar 110. The latter bar 130 is hereinafter referred to as a gripper bar and fixed to the latter by any suitable means such as bearing 118 swaging or the like. It will be noted that this bearing 118 is provided with annular upstanding flanges 119, 119' which extend to either side of bracket 123 and this permits rotation of the gripper bar 130 in bracket 123 and, secondly, the annular flanges act to preclude lateral movement of the gripper finger bar 130 laterally with respect to pad bar 110, the latter element trailing behind, is positioned slightly above and parallel to pad bar 110 as clearly shown in FIGS. 4 and 12.

As seen in FIGS. 3, 4 and 10, the gripper bar 130 itself is provided with a series of generally L-shaped fingers 131 curving downwardly and forwardly underneath the pad bars 110. The terminal end of each of these fingers 131 is so oriented as to rest against each of the pads 117 provided on the underside of pad bar 110. Obviously the number of gripper fingers 131 on each gripper bar 130 corresponds to the number of and spacing of the pads 117 provided on pad bar 110.

Each of the gripper fingers 131 is mounted on gripper bar 130 so as to be rotated as the gripper bar 130 rotates and further because of the mounting structure employed each finger 131 rotates, within specific limits, on the gripper bar 130 independently of any rotation of this bar in brackets 123. As shown in FIGS. 10 and 11, this action is accomplished by providing on the gripper bar 130 an annular bushing 132 having annular upstanding flanges 133. The bushing is pin connected to the gripper bar 130 by pin 134 which serves the function of fixing the bushing 132 to the bar 131 both against lateral and rotational movement with respect to the bar 130.

The upper end of the generally vertical leg 135 of the gripper finger 177 terminates in a pair of laterally spaced co-axial rings 136, 137, FIG. 11, formed integrally with the finger and surrounding the bushing 179 such that these rings abut against and are rotatable upon the upraised annular flanges 133 of bushing 132. Between these rings and surrounding the mid-portion of bushing 132 is a clamp 138 generally U-shaped in configuration, opening toward the rear and having its upper and lower arms joined by a bolt 139. This bolt also affixes to the lower leg of the U-shaped clamp 138 an L-shaped bracket 141 which has one leg resting in a horizontal position against the clamp and a vertical leg 142 provided with a tongue 143 extending downwardly parallel to the generally vertical portion of gripper finger 131. Positioned between the back of the said finger 131 and the vertical leg 142 of the mentioned bracket 141 is a coil spring 140. As seen in FIG. 10 this spring acts to cause the gripper finger 131 to be rotated in a clockwise direction about the gripper bar 130.

As will become apparent it is necessary to limit this clockwise rotation of the finger 131. To this end it will be seen that the U-shaped clamp 138 is provided with a horizontal step or land 145 which extends laterally across its width. This land 145 is engaged by a web 147 which connects the two ring mounting members 136, 137 together transversely across the face of the finger. Thus it may be seen that each of the fingers 131 may move independently of any movement of the gripper bar 130 against the action of spring 197, i.e., in a counter-clockwise direction as shown in FIG. 10, yet all of the fingers 131 grouped on any one of the gripper bars 130 will be moved simultaneously upon rotation of the bar itself in either a clockwise or counter-clockwise direction.

Turning now to FIGS. 7 and 8, consideration will now be given to the manner in which the gripper bar 130 is rotated in brackets 123. As can be readily noted the gripper bar 130 is essentially a hollow tube open at both ends. Disposed internally of the right hand end of the tube, as viewed in FIG. 7, is an apertured plug-like element 151 which also carries roller cam follower C mounted on lever arm 152. The plug 151 and hence the cam follower C are fixed to the end of the tube as by welding or the like, such that any motion imparted to the follower C will impart rotary motion to the gripper bar 130 and hence to the gripper fingers 131 mounted thereon. Thus the gripper fingers 131 can be moved to a closed position against the pads 117 on pad bar 110 or moved to an open position away from the pads 117 depending on the motion of cam follower C.

It has been found desirable, however, not to rely solely on the action of the cam follower C to control the motion of the gripper fingers 131 and hence gripper bars 130. To this end it will be noted that the aperture 153 in plug 151 is rectangular in form, defining a socket which receives one end of a similarly shaped bar 155. This bar 155 is formed from a metal having the desired resilience characteristics so as to function as a torsion bar. Obviously then, since one end of the torsion bar 155 is movably mounted, the opposite or left hand end of the rod, as viewed in FIG. 7, must be fixed against movement if the stresses built-up by twisting of this bar are to be effective. To this end there is provided an end cap 157 which anchors the torque rod 155 against rotation. End cap 157 is generally elliptical in form and is provided with two inwardly facing projections 159, 161 (as viewed in FIG. 7) which extend into the respective open ends of pad bar 110 and gripper bar 130. The projection 159 is locked in place within pad bar 153 by any suitable means, while the projection 161 which extends into gripper bar 130 is similar to the plug 151 in that it is provided with a rectangular socket 163 and receives the end of the torque bar 155. The gripper bar, then can rotate on the projection 161 and as it does the torque bar will be stressed since the opposite end of the torque bar 155 is held immobile. Thus movements of cam follower C, hence gripper bar 130 in either rotary direction, will induce a torque in bar 155 which influences the entire assembly to return to a neutral position. Preferably no torque is induced in the rod 210 when the gripper fingers 130 are at an intermediate position between their fully closed and fully open limits. The reason for this will also become apparent hereinafter.

Before considering the operation of the apparatus as described thus far, reference to FIGS. 3, 14 and 15 is believed in order and the structure therein shall be discussed at this point.

FIGURE 13 along with FIG. 1 illustrates, schematically, the drive system which is used to power the gripper delivery system 30 from the cutter 20. As has been pointed out, cutter 20 includes a simple right angle gear box 25 which is driven from the conventional cutter drive system via chain 28 and sprocket 26, as illustrated in FIG. 1. Power is thus provided to rotate shaft 29 which extends from the gear box 25, in a horizontal plane, toward the delivery assembly 30.

Since the cutter 20 must be movable toward and away from the delivery assembly 30, shaft 29 is connected by means of a conventional spline-type, slip coupling arrangement 34A to a shaft 170 which is suitably journaled on the delivery assembly frame as by conventional pillow blocks 171. Shaft 170 in turn is journaled in housing 251 of differential 200 by means of a bearing 253. The terminal end of the shaft 170, within the housing 253, is provided with a conventional bevel gear 255 which in turn is meshed with a series of, preferably four, pinions 257 in turn journaled in a pinion carrier 259. The pinion carrier 259 is in turn, mounted on and carried by a large spur gear 261. This gear 261 is affixed to the terminal end of shaft 252 which is supported in the housing 251 by bearing 263. The spur gear 261 is, at its periphery, in engagement with a worm gear 265 which is suitably journaled in the top of the housing 251 and, further, which may be rotated by the operation of a hand wheel 260 disposed exteriorly of said housing.

Continuing, further, it will be seen in FIGURE 13, the shaft 252 extends completely along the frame of the delivery assembly 30, being suitably mounted in pillow blocks 257 at various points therealong. The extreme terminal end of shaft 252 is positioned beneath the sprocket 102 of the delivery assembly and power is transmitted therefrom to the sprocket 102 via a simple arrangement of right angle drive gears 270, 271, 272, the latter of which is carried on shaft 275 which is journaled in frame support beams 31, 31' and carries the sprockets 137, 137' illustrated in FIG. 2 and also FIG. 13. Thus power from the cutter 20 is transmitted to the gripper delivery assembly 30, specifically the gripper bar assemblies 100 and, obviously, the two mechanisms will be driven in synchronism such that the speed of the flyknife 12 and the gripper bar assemblies 100 is coordinated so that the bar assemblies 100 will engage the leading edge of each sheet regardless of size of the sheet being cut.

Broadly speaking, the splined coupling assembly 34A is provided to maintain a fixed velocity relationship between the gripper bar assemblies 100 and the flyknife 12 whereby the entire cutter assembly 20 is selectively adjustable longitudinally of the machine as seen in FIG. 1 without disturbing the velocity relationship, thereby eliminating complex systems for adjusting the actual or relative velocities of the flyknife and grippers when the spacing is changed to cut sheets of a different size. In other words, the invention comprehends the provision of a synchronizing means for causing the grippers on the gripper bar assemblies 100 to grasp the leading edge of a cut sheet at the time the cutting is completed by the cutting means 12 while maintaining via the splined coupling 34A the linear velocity relationship between the grippers and the cutting means 12 and permitting selective adjustment via the screw jack 17 of the spacing between the cutting means and the gripper delivery assembly 30 whereby sheets of different length can be selectively cut pursuant to said selective adjustment. In the preferred embodiment the linear velocity of the gripper assemblies is at least equal to the peripheral lineal velocity of the flyknife.

Referring now to FIGS. 14 and 15 of the drawing, the remaining details of the delivery assembly will be considered to complete the disclosure of structural components before the overall operation of the invention is discussed. Thus, turning to FIG. 14 it may be seen that each "lift" forming station 41, 42, aside from the lift tables, includes a plurality of related pairs of jogger elements 280, 280', 281, 281'. As shown these elements comprise flat plates defining generally a rectangular box-like receptacle which overlies pallets 71, 71' and is positioned such as to practically duplicate the dimension of the sheets being cut on the apparatus. The jogger elements or plates are carried on shafts 283, 283' of vibrating motors 284, 284' either pneumatically or electrically powered and suitably suspended from brackets 287, or frame braces 289 respectively. By suitable arrangements within the motors, the shafts 283, 283' are connected with hand cranks 285, 285' such that the distances between jogger elements 280 and 281' can be varied to accommodate different sheet lengths and widths. Thus as sheets are deposited on pallet 71 the jogger elements will align each sheet in even superposed position to form "lifts" wherein the edges of the sheets are properly aligned.

As has been pointed out, there are two "lift" forming stations in the embodiment of the invention illustrated in FIGS. 1 and 2. Obviously, since the bottom of the frame work between side rails 31, 31' is open, it is necessary to cover the alternate stations, in this case bay 41, when a "lift" is being formed in bay 42. FIGURE 15 along with FIGURE 1 discloses a retractable blanket 300 which may be extended over the top of bay 41 so that sheets may be carried without interruption to bay 42. While various hydraulic or pneumatic means may be used to retract or extend the blanket 300, in this case the mechanism is comprised of a pair of horizontally movable rack bars 301 (only one shown) attached to the leading edge 303 of the blanket 300. The rack bars ride in suitable guides 305 mounted on frame rail 31. A pinion 307 powered by electric motor M mounted on a suitable bracket assembly 310 moves the rack bar 301, hence blanket 300. As shown in FIGURE 15 in particular, the blanket is fixed at its opposite end to frame rail 31 (also 31' though not shown) by means of a cross-bar 309 over which the end is looped and then sewed or stapled. Thus, in its retracted position, the blanket loops down by gravity and then is pulled by the rack and pinion drive means 301, 305 into a horizontal flat position over bay 41 when desired.

Returning briefly to FIG. 1 it will be noted that between bay 39 and 41, suitably mounted on frame rails 31, 31' there is provided a vertically swingable diverter gate 350. This gate is rake-like in plan appearance and the ends of the teeth 351 project slightly over the edge of the conveyor 75. As shown in FIG. 1, the gate is disposed in a horizontal plane so as not to interfere with movements of the sheet along the length of the delivery assembly 30. On occasion, as will be described subsequently, the diverter gate will be raised slightly so as to interfere directly with the passage of sheets to the bays 41, 42 and to this end a hydraulic motor 370 is suitably mounted on a bracket 371 affixed to the stanchions 33, 33'. The piston rod thereof is in turn connected to the gate 350 by a lever 372 such that the actuation of the motor will cause the gate 350 to swing up very slightly to an extended position.

Having described the structure and mechanical components of the apparatus in detail, consideration will now be given to the operation of the invention. As is customary, the roll stand 10 is provided with the desired number of rolls 4 to be cut into sheets. This may be optionally one or more rolls, generally eight rolls being the upper limit. The ends of the rolls are threaded through the cutter 20 as is also customary. Having determined the length of the sheets to be cut, the cutter 20 is moved longitudinally relative to the gripper delivery assembly 30 such that the leading edge of each sheet carried by tapes 125, FIGURE 3, will be at the point of pick-up by the delivery assembly 30 at the proper time. Thus if a 48 inch sheet would be cut the cutter would be moved closer to the delivery system 30 then would be the case where a 72 inch sheet is to be cut. Having determined that a sheet will be completely severed by the cutter at the moment the edge thereof approaches the pick-up point, the cutter 20 is positioned accordingly via the screw jack mechanism 16, 17, 18, etc., provided at the cutter base.

Obviously, it would be substantially impossible by such a coarse adjustment to coordinate cutter 20 and delivery system 30 such that a gripper bar assembly 100 is located at the precise point of pick-up. However, a fine adjustment means 300 is operated by rotation of hand wheel 260. Preferably this adjustment is carried out with the cutter 20 running, such that rotation of the hand wheel 360 will cause movement of spur gear 261 and associated pinion gears 257, with the result that shaft 252 which powers the chains 120, hence, the gripper assemblies 100, will turn, moving sprocket 137, hence the chains 120 and gripper bar assemblies 100. Thus the position of the latter may be adjusted such that the relative position of the leading edge of a cut sheet and the gripper bar assembly 100, which is to be aligned to pick-up the sheet edge, may be properly coordinated. It will be apparent that, utilizing the coarse adjustment of moving cutter 20 relative to the delivery assembly 30, such that the distance between bed knife 11 and the pick-up point of the gripper delivery bars 100 approximates the length of the sheet to be cut, plus the use of the fine and final adjustment provided via the differential drive 200, a smooth transfer of the sheet may be obtained from tapes 125 onto the delivery assembly 30.

Turning now to FIG. 3, it will be seen that gripper closing cam 87 is so configured that as the individual gripper bar assemblies 100 reach the pick-up point the cam follower C will cause the gripper bar 130 to rotate relative to pad bar 110, bringing the gripper fingers closed against the pads 117 to firmly yet resiliently grip the cut sheets therebetween. It will be appreciated that since the fingers 131 are resiliently or yieldingly mounted on gripper bar 130, there is relatively little shock as the fingers contact the pads 117 and, additionally, variation in thickness of the cut sheet, due to the basis weight thereof or the number of sheets being cut simultaneously are readily accommodated. Also, the biasing arrangement for the gripper fingers provides a safety factor should, for some reason or another, the sheets become buckled or mis-guided and bunched up to cause a greater than normal thickness of material to be grasped between the pads 117 and gripper fingers 131. The fingers can then yield to a sufficient degree to prevent their being broken or damage to the gripper bars 130, cam followers C or the cam tracks 81, 83 and associated parts.

Assuming that, as shown in FIG. 3, the gripper fingers 130 have just closed on the edge of the sheet, it will be apparent as the bar assemblies 100 are caused to traverse the support beams 31, the sheet will be carried along the length of the delivery assembly 30 and, at the discretion of an operator, deposited on conveyor 75 in bay 39 or alternatively in either bay 41 or 42, as may be desired.

Control of the place at which the sheet may be deposited is of course, affected by appropriate positioning of the plates 91 of the release cams 90. Thus if deposit is to be for inspection via bay 39, conveyor 75 to inspection table 77, the diverter cam 90 fixed in association with bay 39 will be actuated to permit the gripper assembly 100 to open just as the sheet is drawn completely over bay 39. In addition, to assure that the sheets are diverted downwardly, gate 350 would be actuated to a raised position to interrupt the sheet movement. This combined operation assures that, if the sheet for some reason, does not clear the gripper fingers 131 cleanly or becomes entangled therein due to a bad pick-up from tapes 125, it will be removed from the delivery system so that only good sheets are delivered to the "lift stations."

As shown in FIG. 1, however, the delivery is being made to bay 41, since the lift in bay 42 is completed and presumably is ready for removal. Thus the covering blanket 300 is retracted as shown and the release cam 90 associated with bay 41 will be energized such that cam follower C acts to cause the gripper assemblies to release each sheet over bay 41. The scissors lift table T associated with bay 42 is raised and with the pallet 71 emplaced thereon and so positioned as to align with the position of the jogger elements 280, 280' and 281, 281'. Thus the cut sheets, when released, will fall by gravity onto the pallet 71 and be aligned thereon parallel to its edges by the vibratory action of the jogger elements 280, 280' and 281, 281' via the motors 284, 284'. As the number of sheets deposited on the pallet builds up, the scissors lift table T is caused to lower in increments designed to keep the top of the pile or "lift" always within the range of action of the jogger elements. On occasion, optionally, at random, or at a predetermined time interval or number count, the release cam 90 associated with bay 39 and, as well, diverter gate 350 may be actuated to remove a sheet or sheets, optionally, from the apparatus via conveyor belt 75 to inspection table 77.

As the number of sheets associated on the pallet in bay 141 reaches the desired number, as may be indicated by visual inspection or by a suitable counting device, a pallet 71' is placed on the lift table T' positioned in bay 42 and this table is raised to the proper position within the jogger elements 280, 280', 281, 281', in bay 42 and the jogger elements appropriately adjusted. When the transition is made from delivery to bay 41 to bay 42, the release cam associated with bay 41 is actuated to cause cam follower C to follow the same path as it does on cam rail 81, while that release cam 90 associated with bay 42 is caused to be actuated to permit the gripper bar assemblies 100 to open over this bay.

Simultaneously, with the reversal of action of the release cams 90, the motor M, FIG. 15, is energized so as to cause rack bars 301 to move to draw the blanket 300 clear across the opening of bay 41 and thus the sheets may be smoothly carried over to bay 42 where they are deposited. When the pallet 71' in bay 42 is loaded, the process is reversed and so forth. It follows that continuous operation of the cutter 20 is affected, while at the same time inspection of selected sheets can be carried out without interrupting the entire operation.

Returning to a consideration of FIGS. 3, 7 and 8, it will be apparent, from the preceding structural description of these figures, that the gripper finger bar 130 is biased by torsion bar 155. As has been stated that torsion bar 144 is so arranged that in an unstressed condition the gripper bar 130 and hence fingers 131 are in an intermediate, i.e. approximately half-opened, half-losed position. This arrangement assures that whether fully open or fully closed sufficient load is imposed on cam follower C to cause it to bear against the cam parts, namely rails 81, 83 and end members 89, 87 and release assemblies 90, such that it will at all times be positively forced to follow the cam surfaces and the action of gripper fingers 131 will be positively controlled.

It is also to be noted that a reversal of position occurs as the grippers assemblies 100 turn over during movement of chains 120, 120' around sprockets 105, 105'. As the cam follower C approaches sprocekt 105 the spoke-like projection 106 picks up the follower C to hold the gripper fingers open. When the follower C engages the top surface of cam rail 89, the cam follower C trails behind the pad bar 110 such that the gripper fingers 171 are widely opened as illustrated by the assembly 100 in FIG. 3 which is shown approaching the sprocket 103 at the top of the drawing. As the gripper assembly 100 is carried around on sprocket 103, the motion of both pad bar 110 and the gripper fingers 131, as they move on multiple axes and as cam roller C follows the bottom contour of the cam surface, is such that the follower C reverts back to a position leading the gripper assembly 100 and the pad bar 110 and the fingers 131 move toward each other with a pinching motion to grip the edge of the sheet. Since at times, the gripper fingers are wide open as they approach the pick-up point and must be moved through about 130° of arc to closed position, it has been found desirable to utilize a trip mechanism comprising a trip 128 mounted on support beam 31, as shown in FIG. 3 which is contacted by a trip arm 129 mounted on the end of gripper bar 130. As the trip arm 129 contacts the trip 128, it assist in the movement of the gripper bar 130 and hence gripper fingers 131 from the open toward a closed position which movement would be difficult to obtain through greater than 90° of arc by cam elements alone.

From the above detailed structural and operational description the mode of operation of the mechanical components of the apparatus are readily apparent. It is believed also readily apparent that numerous methods and types of control systems can be utilized for controlling the various fluid motors, cams, etc. For the purpose of illustration FIGS. 16 and 17 of the drawing are schematic views setting forth at least one mode of operation, the various movable parts being presented in schematic form but at the same relative position at which they are located on the cutter 20 and delivery assembly 30 as shown in FIG. 1 to avoid unnecessary complication of the drawings.

Figure 16:
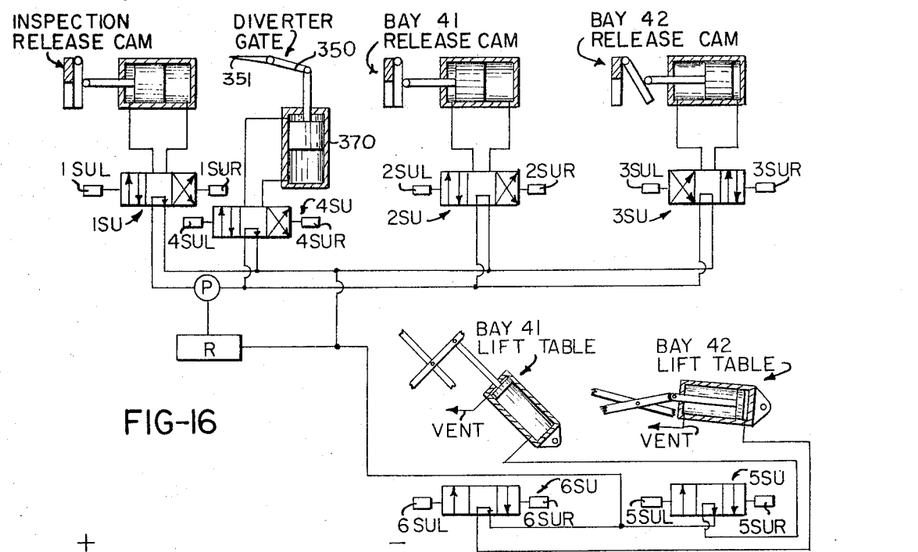
FIGS. 16 and 17 are schematic illustrations of a power and control system which may be used to control the various structural and functional components.

From FIG. 16 it may be seen that the release cams and inspection cam motors are all actuated by solenoid operated fluid valves 2SU, 3SU and 1SU respectively. Also the diverter gate motor is controlled by solenoid operated fluid valve 4SU. Each of these valves may be of the spring-biased by-pass type which are biased to a neutral by-pass position as shown when the actuating solenoids are not energized.

The two lift tables are operated by fluid motors under the control of by-pass solenoid actuated valves 5SU and 6SU respectively. These valves are similar to valves 1SV etc., but since the lift table motors are of the single acting type they merely control the entry and exhaust of a fluid pressure medium, be it pneumatic or hydraulic pressure, to one end only of these motors. The opposite end is simply vented to atmosphere.

Figure 17:
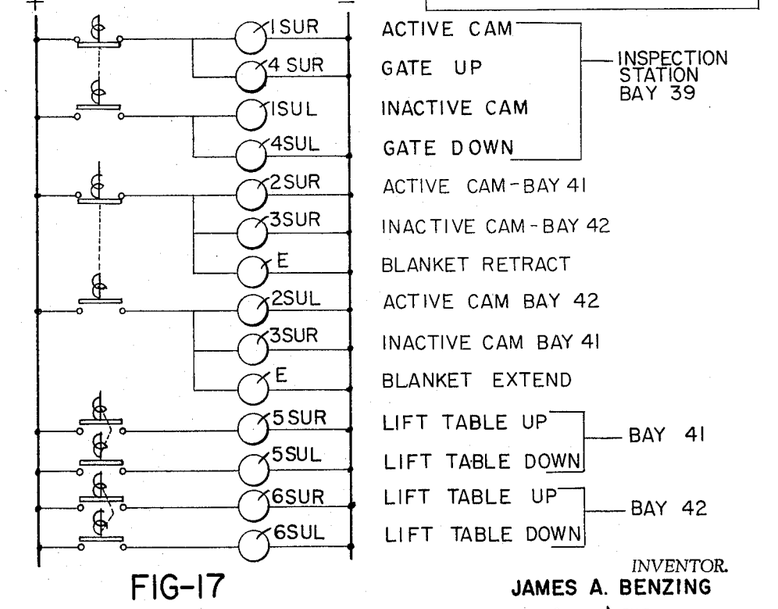

As further indicated in FIG. 17 the solenoids are operated by switches preferably push button switches which are generally of the spring biased to neutral type with two buttons controlling each valve 1SV, etc., so interlocked that it is impossible to energize both sides of any of the solenoid valves inadvertently.

Considering both FIGURES 16 and 17 concurrently, it will be seen that, as shown, the various cams, lift tables, etc., are conditioned such that the apparatus is in the operating condition as shown in FIGURE 1, that is, bay 42 contains a full "lift" while bay 41 is ready to receive a new "lift" on pallet 71'. The operator now pushes the switch $B_2$ to de-activate the release cam 90 associated with bay 42. Solenoids 2SVL and 3SVL are energized such that valves 2SVR and 3SVR move to the left. Fluid pressure is thus supplied to the motors M such that the release cam 90 associated with bay 42 is rendered inactive while that associated with bay 41 is rendered active as the cam blocking plates 91 move or pivot in opposite directions at each station.

Simultaneously, motor E which drives the blanket 300 is energized to retract the blanket from its overlay position over bay 41. Thus loading of the pallet 71 in bay 41 is initiated and the pallet 71' can be removed from bay 42 and a new pallet readied for receipt of a lift.

At selected times, the operator may press button switch A. Solenoid 1SVR is energized and valve 1SV moves to cause motor M to pivot the blocking plate so as to activate the inspection release cam. Simultaneously the solenoid 4SVR is energized such that valve 4SV moves to the right and the diverter gate 350 is lifted. The sheets being cut will then be diverted onto conveyor 75 and discharged onto inspection table 77. After a selected number of sheets have been diverted or after a predetermined period, button $A_2$ is pressed reversing both valves 1SV and 4SV as solenoids 1SVL and 4SVL are energized to return the inspection release cam to an inactive condition and simultaneously to drop diverter gate 350 to an inactive position.

Periodically, also, the operator "feathers" switch $C_2$ to energize solenoid 5SVL to bleed the lift table motor permitting the table to collapse in small increments so as to maintain the top of the lift within the area defined by joggers 280, 280' and 281, 281' as has been described.

When pallet 71' is replaced switch D is depressed and solenoid 6SVR is energized moving valve 6SV to the right such that the lift table raises to the position ready to receive a new "lift."

As the lift in bay 41 is completed, the operator repeats the process of depressing switches B and C to reverse the lift forming station from bay 41 to bay 42.

While manually operated controls are shown, it will be appreciated that the solenoids can all be actuated by automatic control means. For example, solenoid 1SVR could be operated from a timer switch to provide regular periodic deflection of cut sheets to inspection table 77. Similarly solenoids 2SV and 3SV could be operated in association with an automatic sheet counting device such as a Stevens counter manufactured by the George M. Stevens Manufacturing Co., Chicago, Illinois.

The control of lift tables 71, 71' can be via a variety of means such as a limit switch contacting the top of the "lift," electric eye or similar means which would continually monitor the height of "lifts" being formed in each bay 41 or 42.

The lift table T may additionally comprise an air lift system on the upper end thereof whereby a package of papers (commonly called a "lift") is floated on a film of air. These are well known and conventional in the art. Advantageously, such an air lift table is arranged to automatically tilt whereby the "lift" floats off the table under the influence of gravity and on the air film to a suitable conveying means, being thereafter transferred to a subsequent operation or to storage.

It will therefore be observed that the invention includes a number of distinctive features. For one, sheets may be delivered to one of a plurality of stations. Each station may constitute a different type of package, such as a "lift" that is handled by the embodiment in the intermediately preceding paragraph, a palletized load such as shown in FIGS. 1 and 2, or a package of cut sheets which has already been placed in a box, the box itself being suitable either for removal by the air film method of FIGS. 18 and 19 or for palletizing for removal as with FIGS. 1 and 2. Moreover, the entire operation of cutting and stacking can be carried out continuously while the papers formed therefrom are delivered to other processes and otherwise removed from the cutting and handling machinery embodying the invention. Also, the invention is for handling not only one sheet of paper as it is cut, but a group of sheets of paper formed as a plurality of layers are drawn from different ones of the rolls 4 represented in FIG. 1. It is to be observed that the handling mechanism is capable of readily picking up a group of such papers while they move and delivering the group to an appropriate one of the bays 39, 41 or 42.

From the above description of an operative embodiment of the invention, it will be appreciated that various changes and modifications may be made within the spirit and scope of the inventive concept which is limited only as defined in the following claims.

Wherein, what is claimed is:

1. An apparatus for cutting and delivering sheets from a continuous web to one of a plurality of selective pile forming stations comprising a stationary frame, a sheet cutting device movably mounted for movement with respect to said frame in a direction parallel to that of the movement of the sheets cut thereon, said sheet cutting device including a rotary cutting member for making cuts transverse of the web, a plurality of pile forming stations positioned beneath said frame and means on the frame for positively engaging the leading edge of the cut sheets and conveying said sheets to a release point above a selected one of said stations, and control means operative on said conveying means for releasing said sheets at said point and means for selectively positioning said cutting device in such direction during operation of said apparatus by moving said cutting device to a selected position and holding it there while maintaining a predetermined velocity relationship wherein the lineal velocity of said means for positively engaging is at least equal to the peripheral lineal velocity of said rotary cutting device.

2. The apparatus as defined in claim 1 wherein said control means comprises a cam mounted on the frame, cam followers carried by said means to cause the conveying means to release said sheets at selected points along said frame.

3. A sheet cutting and delivery apparatus for cutting sheets from a continuous web and depositing each of said sheets in a pile comprising a cutter and a delivery assembly, said cutter being movable toward and away from said delivery assembly, said delivery assembly comprising a plurality of bays, means disposed in each bay for receiving sheets, means on the frame for gripping and conveying the sheets from said cutter along said delivery assembly over said bays, said last mentioned means including cam means actuating said gripping and conveying means to grip said sheets at their point of emergence from the cutter and to release said sheets at a selected point along said delivery assembly for deposit in a selected one of said bays, and on at least one of said bays a retractable blanket means extendable across the top thereof to permit said sheet to move uninterruptedly across said bay for deposit in another of said bays.

4. An apparatus for cutting and delivering sheets of a predetermined size from a continuous web comprising a cutter, a backstand means for supporting rolls of material being fed to said cutter, means for receiving cut sheets from said cutter, said last mentioned means comprising an elongated frame having a plurality of sheet receiving bays aligned in longitudinal succession, means disposed in each of said bays for receiving the sheets, means mounted on said frame for gripping the edge of the sheet delivered from said cutter and conveying said sheet across the top of each of said bays, control means for releasing said gripper means to permit said sheets to deposit selectively on said sheet receiving means, at least one of said bays including retractable blanket means extendible across the top thereof to permit said sheet to move uninterruptedly across said bay for deposit in the other of said bays, said control means including cam means engaged by said gripper means, said cam means including selectively controllable gripper release means disposed above each bay.

5. An apparatus for cutting and delivering sheets from a continuous web comprising a cutter means and a sheet delivery assembly associated with said cutter means and disposed such as to receive sheets moving from said cutter means, said last mentioned means including a plurality of cam operated gripper assemblies engaging said sheets for conveying same away from said cutter, means for moving said cutter relative to said gripper assemblies such that the leading edge only of said sheets is engaged by each of said gripper assemblies, and drive means for moving said gripper assemblies in synchronous relation with said cutter, said last mentioned means including a differential means and means for adjusting said differential means to move said gripper assemblies independently of said cutter to permit adjustment of the position of said girpper assemblies whereby only the leading edge of the sheets are engaged thereby.

6. An apparatus as defined in claim 5 wherein said drive means includes a means for causing the gripper assemblies to grasp the leading edge of a cut sheet at the time the cutting is completed by the cutter means while maintaining the linear velocity relationship between said gripper assemblies and said cutter and while permitting selective adjustment of the spacing between said cutter and said sheet delivery assembly, whereby sheets of different length are selectively cut pursuant to said selective adjustment.

7. An apparatus as defined in claim 6 including a plurality of elastically extensible and contractible tapes for conveying the leading edges of said sheets from said cutter bed knife to said gripper assemblies.

8. An apparatus for cutting sheets from a continuous web an delivering said cut sheets to at least one of a plurality of piling stations comprising a cutter and a delivery assembly, said cutter being movably mounted with respect to said delivery assembly, gripper means carried by said delivery assembly and movable continuously toward and away from said cutter, means for controlling said gripper means at a point wherein the direction of movement of said means away from said cutters is initiated to close said means about the leading edges of the sheets cut by said cutters, and drive means for moving said cutter and said gripper assemblies, said drive means including a prime mover for simultaneously operating said cutter and moving said gripper means, said drive means including, further, an adjustment means for positioning said cutter relative to said gripper means while said cutter and gripper means are operating and which holds said cutter in the position to which it is moved.

References Cited by the Examiner

UNITED STATES PATENTS

| | | | |
|---|---|---|---|
| 781,903 | 2/1905 | Pancoast | 83—94 X |
| 1,226,168 | 5/1917 | Barber | 198—180 X |
| 1,444,088 | 2/1923 | Sheldon | 209—74 |
| 1,486,306 | 3/1924 | Schultz | 83—151 X |
| 1,605,816 | 11/1926 | Dietrich | 83—23 |
| 1,963,902 | 6/1934 | Hires | 83—23 |
| 2,589,673 | 3/1952 | Cobb | 83—89 |
| 2,759,543 | 8/1956 | Conti | 83—89 |
| 2,996,982 | 9/1961 | Alm | 83—151 X |
| 3,053,532 | 9/1962 | Weidman | 271—64 |
| 3,106,393 | 10/1963 | Koch | 271—64 |

WILLIAM W. DYER, JR., *Primary Examiner.*

ANDEW R. JUHASZ, *Examiner.*

J. L. SEITCHIK, L. B. TAYLOR, *Assistant Examiners.*